United States Patent
Cai et al.

(10) Patent No.: US 11,646,030 B2
(45) Date of Patent: May 9, 2023

(54) SUBTITLE GENERATION USING BACKGROUND INFORMATION

(71) Applicant: International Business Machines Corporation, Armonk, NY (US)

(72) Inventors: Zhuo Cai, Beijing (CN); Wen Wang, Beijing (CN); Jian Dong Yin, Beijing (CN); Rong Fu, Ningbo (CN); Hao Sheng, Ningbo (CN); Kang Zhang, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 275 days.

(21) Appl. No.: 16/922,346

(22) Filed: Jul. 7, 2020

(65) Prior Publication Data
US 2022/0013125 A1    Jan. 13, 2022

(51) Int. Cl.
*H04L 29/06*    (2006.01)
*G10L 15/26*    (2006.01)

(52) U.S. Cl.
CPC .................... *G10L 15/26* (2013.01)

(58) Field of Classification Search
CPC ....... G10L 15/065; G10L 15/22; G10L 15/26; G10L 2015/226; G06F 17/2775
USPC ........................................................ 704/235
See application file for complete search history.

(56) References Cited

U.S. PATENT DOCUMENTS

| | | | |
|---|---|---|---|
| 11,070,891 B1* | 7/2021 | Effinger | .............. G10L 15/26 |
| 2007/0011012 A1 | 1/2007 | Yurick | |
| 2021/0019369 A1* | 1/2021 | Sharma | .............. G06F 17/2775 |

OTHER PUBLICATIONS

IBM et al., "Improve automatically generated subtitles using character recognition", An IP.com Prior Art Database Technical Disclosure, IP.com No. IPCOM000243520D, IP.com Electronic Publication Date: Sep. 29, 2015, 2 pages.

(Continued)

*Primary Examiner* — Md S Elahee
(74) *Attorney, Agent, or Firm* — David B. Woycechowsky

(57) ABSTRACT

A video is received. One or more subtitles are determined for the video. Whether a word found in a background of the video is similar to a word found in the one or more subtitles is determined. Responsive to determining the word found in the background of the video is similar to the word found in the one or more subtitles, one or more updated subtitles are generated. The one or more updated subtitles include the word found in the background of the video and remove the word found in the one or more subtitles that is similar. A metric for the one or more updated subtitles is calculated. Whether the metric is larger than a threshold is determined. Responsive to determining the metric is larger than the threshold, the video is updated to include the one or more updated subtitles.

3 Claims, 4 Drawing Sheets

(56) References Cited

OTHER PUBLICATIONS

Lee et al., "Multimodal Feature Learning for Video Captioning", Hindawi, Mathematical Problems in Engineering. vol. 2018, Article ID 3125879, Published Feb. 19, 2018, 9 pages.

Sankhe et al., "Video based Subtitle Generation", International Journal for Research in Applied Science & Engineering Technology (IJRASET), ISSN: 2321-9653, IC Value: 45.98, SJ Impact Factor: 6.887, vol. 6, Issue III, Mar. 2018, 4 Pages.

Yang et al., "Content Based Lecture Video Retrieval Using Speech and Video Text Information", IEEE Transactions on Learning Technologies, vol. 7, No. 2, Apr.-Jun. 2014, 13 Pages.

Yang et al., "Lecture Video Indexing and Analysis Using Video OCR Technology", Hasso Plattner Institute (HPI), University of Potsdam, DLINE, Journal of Multimedia Processing and Technologies, vol. 2, No. 4, Dec. 2012, 21 Pages.

\* cited by examiner

US 11,646,030 B2

SUBTITLE GENERATION USING BACKGROUND INFORMATION

BACKGROUND

The present invention relates generally to the field of subtitle generation, and more particularly to generating subtitles using information found in the background of the video.

A subtitle is text that is created from the audio found in media, such as a film, television program, presentation, etc. Additionally, a subtitle may be created in a language different than the language spoken in the media to allow users to understand what is happening in the media. Generally, a subtitle is shown on the bottom of the display, however a subtitle can be found anywhere on the display that displays the media or on an alternative display. Subtitles can be created from transcripts of the audio found in the media. With the advancement of computing technologies, speech recognition technology can generate subtitles for video without transcripts of the audio thus removing human interaction.

SUMMARY

Embodiments of the present invention include a method, computer program product, and system for subtitle generation. In one embodiment, a video is received. One or more subtitles are determined for the video. Whether a word found in a background of the video is similar to a word found in the one or more subtitles is determined. Responsive to determining the word found in the background of the video is similar to the word found in the one or more subtitles, one or more updated subtitles are generated. The one or more updated subtitles include the word found in the background of the video and remove the word found in the one or more subtitles that is similar. A metric for the one or more updated subtitles is calculated. Whether the metric is larger than a threshold is determined. Responsive to determining the metric is larger than the threshold, the video is updated to include the one or more updated subtitles.

DETAILED DESCRIPTION

Subtitles can be generated for audio in different forms of media. Speech recognition technology is widely used in subtitle generation for media. However, some words may be translated with mistake, especially for some domain specific vocabularies. Additionally, some words are translated correctly in pronunciation but may be mis-split or mis-merged words which loses the raw meaning of the word. Embodiments of the present invention recognize that the correct spelling of words may already be in the background of the media and these spellings maybe used to update subtitles to be more accurate.

Embodiments of the present invention provide at least for locating similar words from the background of media to words in a translated subtitle. Embodiments of the present invention provide at least for replacing words in the subtitles with similar words in the background and then calculating a sentence generation probability using a language model and comparing the value calculate o the value of the sentence generation probability of the current subtitle. Embodiments of the present invention provide at least for combining other semantic information such as context and word domain to generate the new subtitles. Embodiments of the present invention provide at least for updating speech recognition technology models as feedback from the new subtitle generation using the background information from the media.

Figure 1:
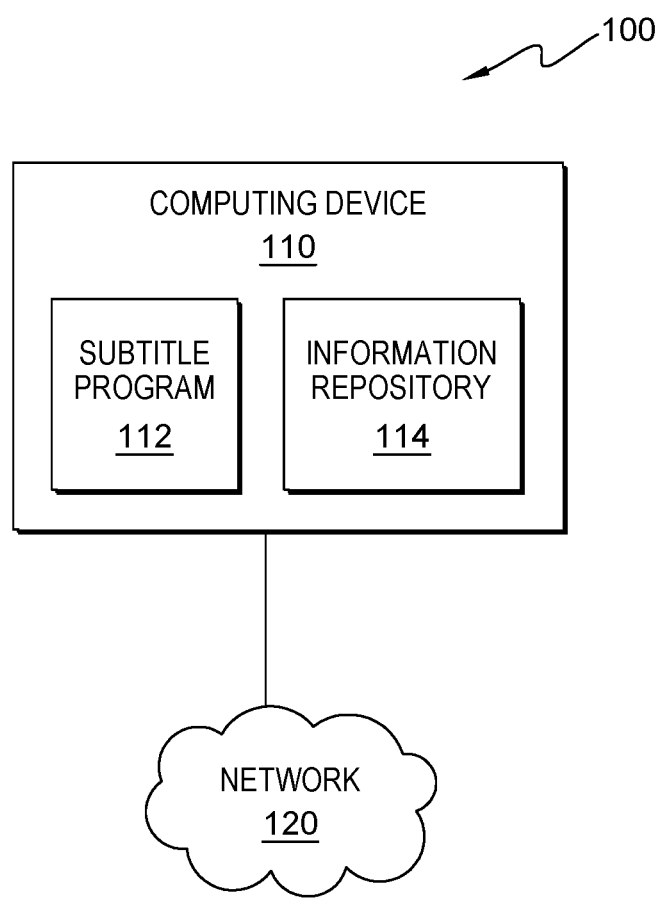
FIG. 1 is a functional block diagram of a network computing environment, generally designated 100, suitable for operation of subtitle program 112, in accordance with at least one embodiment of the invention.

Referring now to various embodiments of the invention in more detail, FIG. 1 is a functional block diagram of a network computing environment, generally designated 100, suitable for operation of subtitle program 112 in accordance with at least one embodiment of the invention. FIG. 1 provides only an illustration of one implementation and does not imply any limitation with regard to the environments in which different embodiments may be implemented. Many modifications to the depicted environment may be made by those skilled in the art without departing from the scope of the invention as recited by the claims.

Network computing environment 100 includes computing device 110 interconnected over network 120. In embodiments of the present invention, network 120 can be a telecommunications network, a local area network (LAN), a wide area network (WAN), such as the Internet, or a combination of the three, and can include wired, wireless, or fiber optic connections. Network 120 may include one or more wired and/or wireless networks that are capable of receiving and transmitting data, voice, and/or video signals, including multimedia signals that include voice, data, and video formation. In general, network 120 may be any combination of connections and protocols that will support communications between computing device 110 and other computing devices (not shown) within network computing environment 100.

Computing device 110 is a computing device that can be a laptop computer, tablet computer, netbook computer, personal computer (PC), a desktop computer, a personal digital assistant (PDA), a smartphone, smartwatch, or any programmable electronic device capable of receiving, sending, and processing data. In general, computing device 110 represents any programmable electronic devices or combination of programmable electronic devices capable of executing machine readable program instructions and communicating with other computing devices (not shown) within computing environment 100 via a network, such as network 120.

In various embodiments of the invention, computing device 110 may be a computing device that can be a standalone device, a management server, a web server, a media server, a mobile computing device, or any other programmable electronic device or computing system capable of receiving, sending, and processing data. In other embodiments, computing device 110 represents a server computing system utilizing multiple computers as a server system, such as in a cloud computing environment. In an embodiment, computing device 110 represents a computing system utilizing clustered computers and components (e.g. database server computers, application server computers, web servers, and media servers) that act as a single pool of seamless resources when accessed within network computing environment 100.

In various embodiments of the invention, computing device 110 includes subtitle program 112 and information repository 114.

In an embodiment, computing device 110 includes a user interface (not shown). A user interface is a program that provides an interface between a user and an application. A user interface refers to the information (such as graphic, text, and sound) a program presents to a user and the control sequences the user employs to control the program. There are many types of user interfaces. In one embodiment, a user interface may be a graphical user interface (GUI). A GUI is a type of user interface that allows users to interact with electronic devices, such as a keyboard and mouse, through graphical icons and visual indicators, such as secondary notations, as opposed to text-based interfaces, typed command labels, or text navigation. In computers, GUIs were introduced in reaction to the perceived steep learning curve of command-line interfaces, which required commands to be typed on the keyboard. The actions in GUIs are often performed through direct manipulation of the graphics elements.

In an embodiment, computing device 110 includes subtitle program 112. Embodiments of the present invention provide for a subtitle program 112 that generates subtitles. In embodiments of the present invention, subtitle program 112 receives a video. In embodiments of the present invention, subtitle program 112 determines subtitles in the video. In embodiments of the present invention, subtitle program 112 determines if words displayed in the video are similar to the subtitles of the video. In embodiments of the present invention, subtitle program 112 generates new subtitles using the words displayed in the video. In embodiments of the present invention, subtitle program 112 calculates a metric for each sentence has a new subtitle generated. In embodiments of the present invention, subtitle program 112 compares the metric to a threshold. In embodiments of the present invention, subtitle program 112 notifies a user and requests input for sentences that have a metric less than the threshold. In embodiments of the present invention, subtitle program 112 updates the subtitles with the generated new subtitles. In embodiments of the present invention, subtitle program 112 updates models used to generate subtitles.

In an embodiment, computing device 110 includes information repository 114. In an embodiment, information repository 114 may be managed by subtitle program 112. In an alternative embodiment, information repository 114 may be managed by the operating system of computing device 110, another program (not shown), alone, or together with, subtitle program 112. Information repository 114 is a data repository that can store, gather, and/or analyze information. In some embodiments, information repository 114 is located externally to computing device 110 and accessed through a communication network, such as network 120. In some embodiments, information repository 114 is stored on computing device 110. In some embodiments, information repository 114 may reside on another computing device (not shown), provided information repository 114 is accessible by computing device 110. Information repository 114 may include, but is not limited to, video data, subtitle data, natural language processing data, threshold data, metric data, domain data used for referencing similar language etc.

Information repository 114 may be implemented using any volatile or non-volatile storage media for storing information, as known in the art. For example, information repository 114 may be implemented with a tape library, optical library, one or more independent hard disk drives, multiple hard disk drives in a redundant array of independent disks (RAID), solid-state drives (SSD), or random-access memory (RAM). Similarly, information repository 114 may be implemented with any suitable storage architecture known in the art, such as a relational database, an object-oriented database, or one or more tables.

As referred to herein, all data retrieved, collected, and used, is used in an opt in manner, i.e., the data provider has given permission for the data to be used. For example, the received video and subtitle information received and used by subtitle program 112 to generate the new subtitles.

Figure 2:
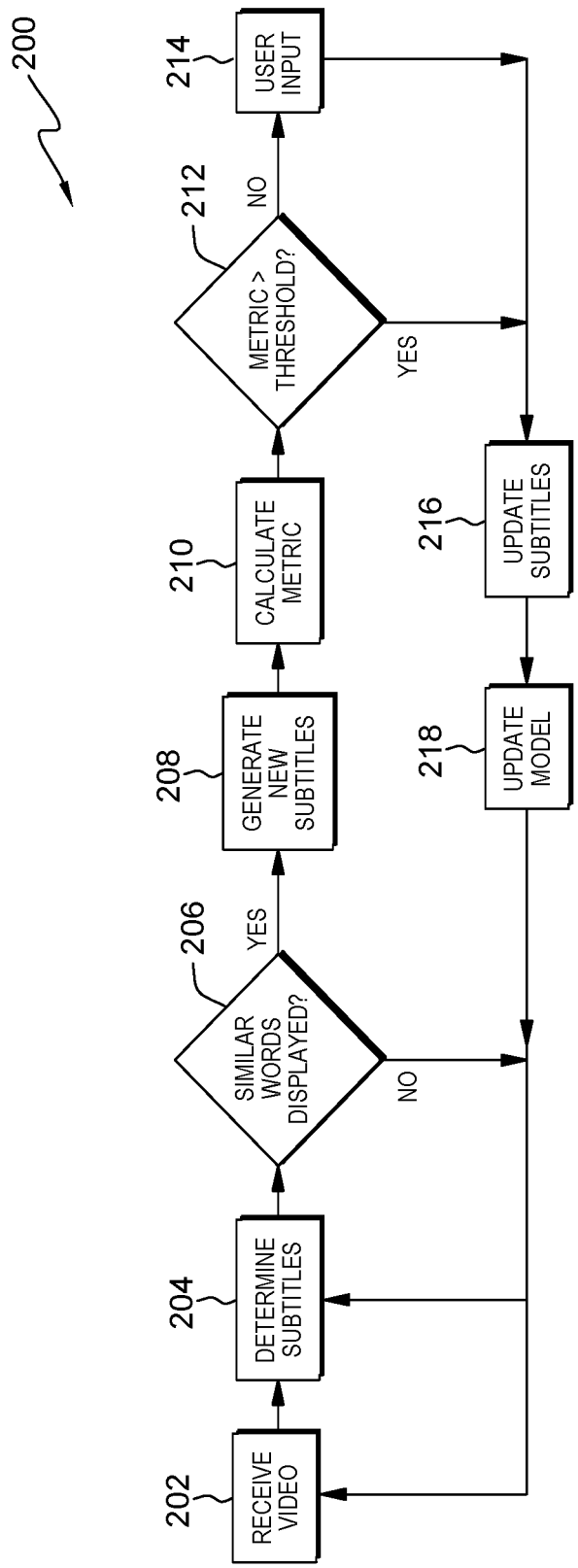
FIG. 2 is a flow chart diagram depicting operational steps for subtitle program 112 for generating subtitles, in accordance with at least one embodiment of the invention.

FIG. 2 is a flow chart diagram of workflow 200 depicting operational steps for subtitle program 112 in accordance with at least one embodiment of the invention. In an alternative embodiment, the steps of workflow 200 may be performed by any other program while working with subtitle program 112. It should be appreciated that embodiments of the present invention provide at least for generating subtitles. However, FIG. 2 provides only an illustration of one implementation and does not imply any limitations with regard to the environments in which different embodiments may be implemented. Many modifications to the depicted environment may be made by those skilled in the art without departing from the scope of the invention as recited by the claims. In a preferred embodiment, a user, via a user interface (not shown), can invoke workflow 200 upon a user wanting subtitle program 112 to generate subtitles for a video.

Subtitle program 112 receives a video (step 202). At step 202, subtitle program 112 receives a video for processing. In an embodiment, the video maybe an electronic medium for the recording, copying, playback, broadcasting, and/or display of moving visual media. In an alternative embodiment, the video may be a series of still images with audio that is associated, such as a presentation of slides that includes audio. In an embodiment, the video may include previously created subtitle information in a form of metadata attached to the video. In an alternative embedment, the video may not include any subtitle information.

Subtitle program 112 determines subtitles (step 204). At step 204, subtitle program 112 determines the subtitles for the audio in the video. In an embodiment, subtitle program 112 determines subtitles for the audio found in the video using speech recognition technology known in the art if there is no existing subtitle information associated with the video. In an embodiment, the speech recognition technology uses a model to determine the subtitles. In an alternative embodiment, subtitle program 112 may communicate the video to another program (not shown) for subtitle processing and the other program may return the subtitles to subtitle program 112. In yet another embodiment, subtitle program 112 may determine the previously created subtitle information already associated with the video if such subtitle information exists.

Subtitle program 112 determines whether similar words are displayed (decision step 206). At step 206, subtitle program 112 determines whether words displayed in the video are similar to words found in the subtitles. In an embodiment, subtitle program 112 uses optical character recognition (OCR) or any other process known in the art to determine the vocabulary and words that are displayed in the video. In an embodiment, subtitle program 112 may processes the entire video to determine whether words displayed in the video are similar to words found in the subtitles. In an alternative embodiment, subtitle program 112 may process smaller section of videos, such as sentences and/or time periods (e.g. 1 minute of video, 5 minutes of video, etc.) In an embodiment, subtitle program 112 may determine a word displayed in the video is similar to a word found in the subtitles if the spelling is similar but not identical. In this embodiment, subtitle program 112 may determine a similar word if a number of letters in the video displayed word and the subtitle words is greater than a threshold. In an alternative embodiment, subtitle program may determine a word displayed in the video is similar to a word found in the subtitle if the words are pronounced similarly by analyzing the syllables of the words and using linguistics to compare the words to determine if they are above a threshold level of similarity. If subtitle program 112 determines a similar word is displayed (decision step 206, yes branch), processing proceeds to generate new subtitles (step 208). If subtitle program 112 determines a similar word is not displayed (decisions step 206, no branch), processing proceeds to step 204 if there is remaining video to be processed and step 202 if there is a no video remaining and a new video is ready to be received.

Subtitle program 112 generates new subtitles (step 208). At step 208, subtitle program 112 replaces the similar words. In other words, subtitle program 112 replaces the words in the current subtitles with the similar words that are displayed in the video. In an embodiment, subtitle program 112 creates new subtitles that includes the similar words that are displayed in the video and removes the current similar words in the original subtitles.

Subtitle program 112 calculates a metric (step 210). At step 210, subtitle program 112 calculates a metric for each sentence in the subtitles that had a word or words replaced with similar word or words that are displayed in the video. In an embodiment, subtitle program 112 calculates the metric as a sentence generation probability using language modeling. In an embodiment, language modeling is an algorithm in natural language processing to calculate the possibility of the generation of a sentence or, in other words, the rationality of a sentence. In an embodiment, language modeling can use any form of probabilistic language modeling known in the art to calculate the metric.

Subtitle program 112 determines whether the metric is greater than a threshold (decision step 212). At step 212, subtitle program 112 compares the metric generated in step 210 is greater than a threshold. In an embodiment, if the metric is greater than the threshold this correlates to the sentence with the similar words from the video replacing similar words in the original subtitles being more accurate or correct. In an embodiment, the threshold may be a metric for the original subtitles that is determined using the same processes of step 210. In an alternative embodiment, the threshold may be input by a user via a user interface by request from subtitle program 112. In yet another alternative embodiment, the threshold may be stored in information repository 114 and may have been determined from user input previously. If the metric is greater than the threshold (decision step 212, yes branch), processing proceeds to update subtitles (step 216). If the metric is less than the threshold (decision step 212, no branch), processing proceeds to user input (step 214).

In an embodiment, if the absolute value of the difference in values between the metric and threshold within a second threshold (e.g., metric=8, threshold=7, therefore difference is 1 and second threshold is 1.1), then subtitle program 112 may use other factors, including but not limited to, domains of context of words, to make a decision whether processing should proceed to step 214 or step 216. For example, if the difference is less than a threshold but the words from the background are in the same context of words as the remainder of the words in the sentence of the subtitles, subtitle program 112 may determine that processing should proceed to step 216. In the same example, if the words from the background are not in the same context of words as the remainder of the words in the sentence of the subtitles, subtitle program 112 may determine that processing should proceed to step 214.

Subtitle program 112 receives user input (step 214). At step 214, subtitle program 112 notifies the user, via a user interface (not shown), that subtitle program 112 will not update the subtitles with the generated new subtitles. In an embodiment, subtitle program 112 may notify the user of the generated new subtitles and subtitle program 112 may receive an indication from the user that the subtitles should be updated using the generated new subtitles. In an embodiment, subtitle program 112 may receive an indication of a change to the generated subtitles from the user.

Subtitle program 112 updates the subtitles (step 216). At step 216, subtitle program 112 updates the subtitles in the video with the generated new subtitles and any updates to the generated new subtitles based on user input. In an embodiment, subtitle program 112 may directly update the video including the subtitles in the video. In an alternative embodiment, subtitle program 112 may updated metadata associated with subtitles and therefore the subtitles can be sent to other devices without having to send the video. In yet another embodiment, subtitle program 112 may transfer or indicate to another program (not shown) the generated new subtitles in order for the other program to update the subtitles in the video.

Subtitle program 112 updates the model (step 218). At step 218, subtitle program 112 updates models that are used to determine subtitles. In an embodiment, subtitle program 112 updates the models based on the generated new subtitles in order to provide more accurate subtitle generation in the future. In an embodiment, subtitle program 112 updates the models used by the speech recognition technology in step 204 to determine the subtitles in the video. In an alternative embodiment, subtitle program 112 may provide the generated new subtitles to other programs (not shown) in order for the other programs to update their models used to determine subtitles.

Figure 3:
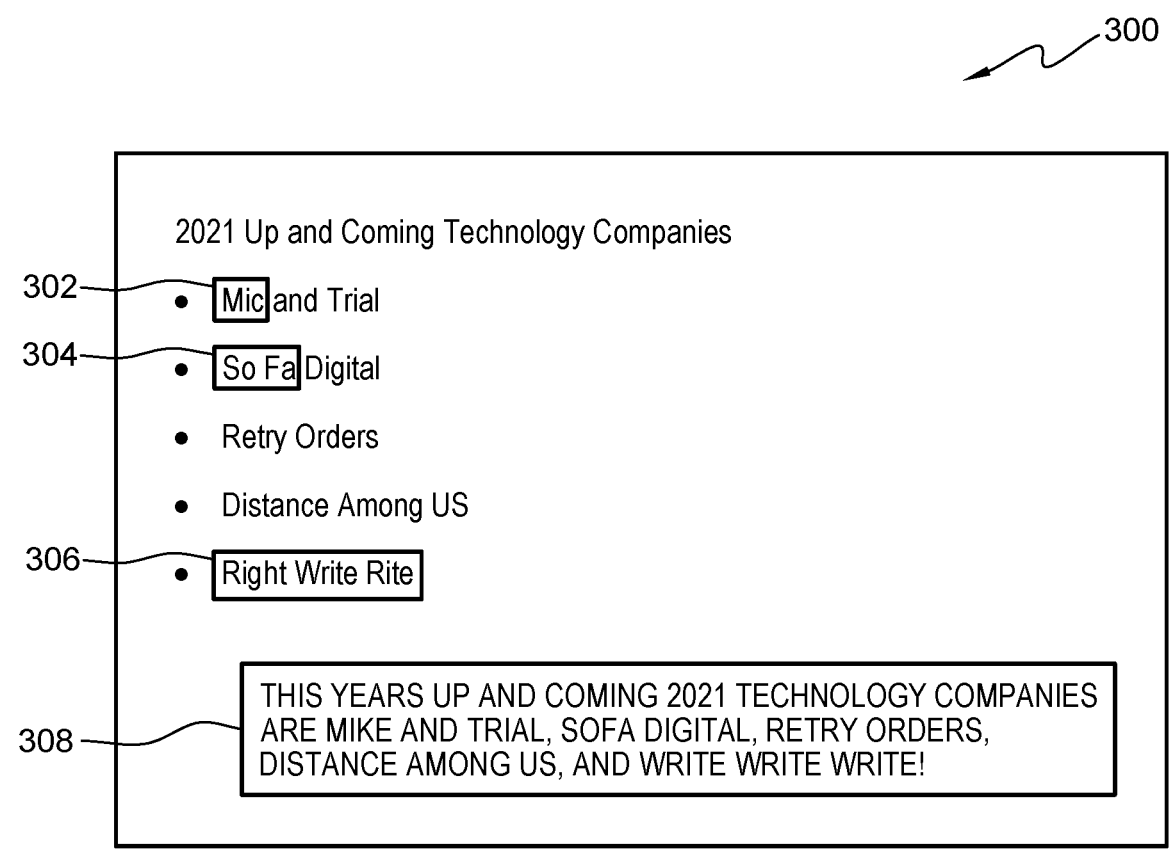
FIG. 3 is an example video display, in accordance with at least one embodiment of the invention.

FIG. 3 is an example video frame 400 depicting a frame in a video, a subtitle, and words displayed in the frame of the video. In this example, FIG. 4 includes a single video frame 400 that is about a presentation for "2021 Up and Comping Technology Companies." In this example, the video frame include five companies. The first company, "Mic and Trial" includes the term "Mic" 302. However, as shown in subtitle 308, "Mic" 302 has been translated to "Mike". In this example, subtitle program 112 would determine that "Mic" 302 is similar to "Mike". The second company, "So Fa Digital" includes the term "So Fa" 304. However, as shown in subtitle 308, "So Fa" 304 has been translated to "Sofa". In this example, subtitle program 112 would determine that "So Fa" 304 is similar to "Sofa." The fifth company, "Right Write Rite" includes the term "Right Write Rite" 306. However, as shown in subtitle 308, "Right Write Rite" has been translated to "Write Write Write." Furthering the example, subtitle program 112 would determine a new subtitle that included the term "Mic" 302 instead of "Mike", "So Fa" 304 instead of "Sofa" and "Right Write Rite" 306 instead of "write write write" and generate a new subtitle that says "This years up and coming 2021 technology companies are Mic and Trial, So Fa digital, Retry Orders, Distance Among Us, and Right Write Rite." In this example, the background words are used to update the subtitles to be more accurate.

Figure 4:
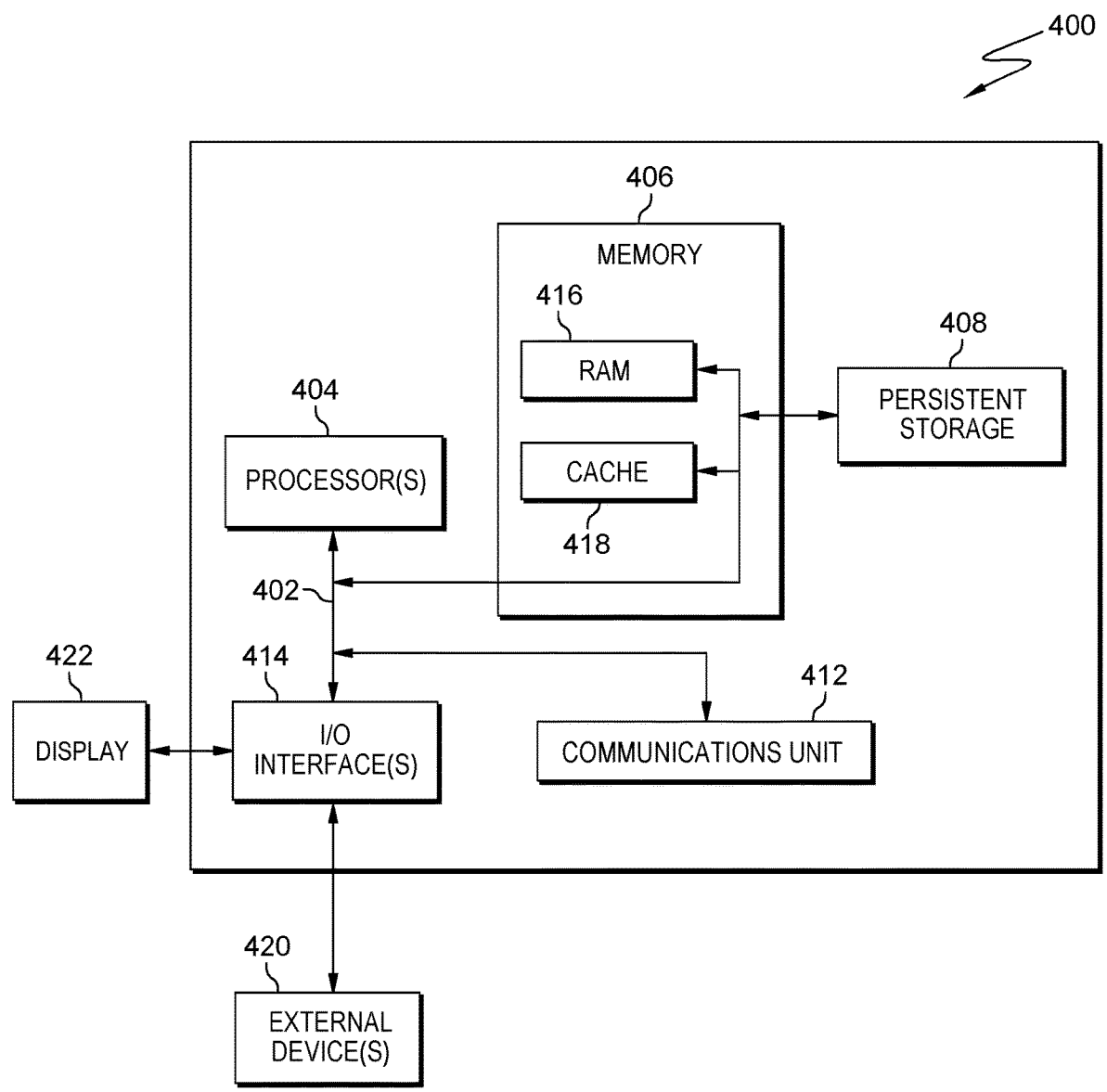
FIG. 4 is a block diagram depicting components of a computer, generally designated 400, suitable for executing subtitle program 112, in accordance with at least one embodiment of the invention.

FIG. 4 is a block diagram depicting components of a computer 400 suitable for subtitle program 112, in accordance with at least one embodiment of the invention. FIG. 4 displays the computer 400, one or more processor(s) 404 (including one or more computer processors), a communications fabric 402, a memory 406 including, a RAM 416, and a cache 418, a persistent storage 408, a communications unit 412, I/O interfaces 414, a display 422, and external devices 420. It should be appreciated that FIG. 4 provides only an illustration of one embodiment and does not imply any limitations with regard to the environments in which different embodiments may be implemented. Many modifications to the depicted environment may be made.

As depicted, the computer 400 operates over the communications fabric 402, which provides communications between the computer processor(s) 404, memory 406, persistent storage 408, communications unit 412, and input/output (I/O) interface(s) 414. The communications fabric 402 may be implemented with an architecture suitable for passing data or control information between the processors 404 (e.g., microprocessors, communications processors, and network processors), the memory 406, the external devices 420, and any other hardware components within a system. For example, the communications fabric 402 may be implemented with one or more buses.

The memory 406 and persistent storage 408 are computer readable storage media. In the depicted embodiment, the memory 406 comprises a random-access memory (RAM) 416 and a cache 418. In general, the memory 406 may comprise any suitable volatile or non-volatile one or more computer readable storage media.

Program instructions subtitle program 112 may be stored in the persistent storage 408, or more generally, any computer readable storage media, for execution by one or more of the respective computer processors 404 via one or more memories of the memory 406. The persistent storage 508 may be a magnetic hard disk drive, a solid-state disk drive, a semiconductor storage device, read only memory (ROM), electronically erasable programmable read-only memory (EEPROM), flash memory, or any other computer readable storage media that is capable of storing program instruction or digital information.

The media used by the persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of the persistent storage 408.

The communications unit 412, in these examples, provides for communications with other data processing systems or devices. In these examples, the communications unit 412 may comprise one or more network interface cards. The communications unit 412 may provide communications through the use of either or both physical and wireless communications links. In the context of some embodiments of the present invention, the source of the various input data may be physically remote to the computer 400 such that the input data may be received, and the output similarly transmitted via the communications unit 412.

The I/O interface(s) 414 allow for input and output of data with other devices that may operate in conjunction with the computer 400. For example, the I/O interface 414 may provide a connection to the external devices 420, which may be as a keyboard, keypad, a touch screen, or other suitable input devices. External devices 420 may also include portable computer readable storage media, for example thumb drives, portable optical or magnetic disks, and memory cards. Software and data used to practice embodiments of the present invention may be stored on such portable computer readable storage media and may be loaded onto the persistent storage 408 via the I/O interface(s) 414. The I/O interface(s) 414 may similarly connect to a display 422. The display 422 provides a mechanism to display data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adaptor card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, though the Internet using an Internet Service Provider). In some embodiments, electronic circuitry including, for example programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram blocks or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of computer program instructions, which comprises one or more executable instructions for implementing the specified logical function(s). In some alternative implementations, the functions noted in the block may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing form the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for subtitle generation, the computer-implemented method comprising the steps of:

receiving, by one or more computer processors, a video;

determining, by one or more computer processors, one or more subtitles for the video;

determining, by one or more computer processors, whether a word found in a background of the video is similar to a word found in the one or more subtitles;

responsive to determining the word found in the background of the video is similar to the word found in the one or more subtitles, generating, by one or more computer processors, one or more updated subtitles, wherein the one or more updated subtitles include the word found in the background of the video and remove the word found in the one or more subtitles that is similar;

calculating, by one more computer processors, a metric for the one or more updated subtitles;

determining, by one or more computer processors, whether the metric is larger than a threshold;

responsive to determining the metric is larger than the threshold, updating, by one more computer processors, the video to include the one or more updated subtitles;

determining, by one or more computer processors, whether an absolute value of a difference in values between the metric and the threshold is within a second threshold; and responsive to determining the absolute value of the difference in values between the metric and the threshold is within the second threshold, determining, by one or more computer processors, whether to update the video to include the one or more updated subtitles based on a domain context of words found in the one or more subtitles and the one or more updated subtitles.

2. A computer program product for subtitle generation, the computer program product comprising:

a set of non-transitory storage device(s); and computer code stored collectively in the set of storage device(s), with the computer code including data and instructions to cause a processor(s) set to perform at least the following operations:

receiving, by one or more computer processors, a video, determining, by one or more computer processors, one or more subtitles for the video, determining, by one or more computer processors, whether a word found in a background of the video is similar to a word found in the one or more subtitles, responsive to determining the word found in the background of the video is similar to the word found in the one or more subtitles, generating, by one or more computer processors, one or more updated subtitles, wherein the one or more updated subtitles include the word found in the background of the video and remove the word found in the one or more subtitles that is similar, calculating, by one more computer processors, a metric for the one or more updated subtitles, determining, by one or more computer processors, whether the metric is larger than a threshold, responsive to determining the metric is larger than the threshold, updating, by one more computer processors, the video to include the one or more updated subtitles, determining, by one or more computer processors, whether an absolute value of a difference in values between the metric and the threshold is within a second threshold, and responsive to determining the absolute value of the difference in values between the metric and the threshold is within the second threshold, determining, by one or more computer processors, whether to update the video to include the one or more updated subtitles based on a domain context of words found in the one or more subtitles and the one or more updated subtitles.

3. A computer system for subtitle generation, the computer system comprising the steps of:

a processor(s) set;

a set of storage device(s); and computer code stored collectively in the set of storage device(s), with the computer code including data and instructions to cause the processor(s) set to perform at least the following operations:

receiving, by one or more computer processors, a video, determining, by one or more computer processors, one or more subtitles for the video, determining, by one or more computer processors, whether a word found in a background of the video is similar to a word found in the one or more subtitles, responsive to determining the word found in the background of the video is similar to the word found in the one or more subtitles, generating, by one or more computer processors, one or more updated subtitles, wherein the one or more updated subtitles include the word found in the background of the video and remove the word found in the one or more subtitles that is similar, calculating, by one more computer processors, a metric for the one or more updated subtitles, determining, by one or more computer processors, whether the metric is larger than a threshold, responsive to determining the metric is larger than the threshold, updating, by one more computer processors, the video to include the one or more updated subtitles, determining, by one or more computer processors, whether an absolute value of a difference in values between the metric and the threshold is within a second threshold, and responsive to determining the absolute value of the difference in values between the metric and the threshold is within the second threshold, determining, by one or more computer processors, whether to update the video to include the one or more updated subtitles based on a domain context of words found in the one or more subtitles and the one or more updated subtitles.

\* \* \* \* \*